(12) United States Patent
Hill

(10) Patent No.: US 7,908,173 B1
(45) Date of Patent: Mar. 15, 2011

(54) VIRTUAL CATALOG AND PRODUCT PRESENTATION METHOD AND APPARATUS

(75) Inventor: Charles E. Hill, Lynn, IN (US)

(73) Assignee: Charles E. Hill & Associates, Inc., Jefferson, TX (US)

( * ) Notice: Subject to any disclaimer, the term of this patent is extended or adjusted under 35 U.S.C. 154(b) by 803 days.

(21) Appl. No.: 11/226,832

(22) Filed: Sep. 14, 2005

Related U.S. Application Data

(63) Continuation of application No. 09/406,477, filed on Sep. 27, 1999, now abandoned, which is a continuation of application No. 08/620,947, filed on Mar. 22, 1996, now Pat. No. 5,970,471.

(51) Int. Cl.
*G06Q 30/00* (2006.01)
(52) U.S. Cl. ............................................ 705/26; 705/37
(58) Field of Classification Search .................... 705/26, 705/37
See application file for complete search history.

(56) References Cited

U.S. PATENT DOCUMENTS

| | | | |
|---|---|---|---|
| 3,757,037 A | 9/1973 | Bialek | |
| 3,899,775 A | 8/1975 | Larsen | |
| 4,149,246 A | 4/1979 | Goldman | |
| 4,204,251 A | 5/1980 | Brudevold | |
| 4,412,285 A | 10/1983 | Neches et al. | |
| 4,414,621 A | 11/1983 | Bown et al. | |
| 4,432,057 A | 2/1984 | Daniell et al. | |
| 4,500,875 A | 2/1985 | Schmitz | |
| 4,530,009 A | 7/1985 | Mizokawa | |
| 4,539,585 A | 9/1985 | Spackova et al. | |
| 4,549,275 A | 10/1985 | Sukonick | |
| 4,553,206 A | 11/1985 | Smutek et al. | |
| RE32,115 E | 4/1986 | Lockwood et al. | |
| 4,645,873 A | 2/1987 | Chomet | |
| 4,661,811 A | 4/1987 | Gray et al. | |
| 4,700,181 A | 10/1987 | Maine et al. | |
| 4,714,992 A | 12/1987 | Gladney et al. | |
| 4,714,995 A | 12/1987 | Materna et al. | |
| 4,734,764 A | 3/1988 | Pocock et al. | |
| 4,751,635 A | 6/1988 | Kret | |
| 4,754,326 A | 6/1988 | Kram et al. | |
| 4,760,458 A | 7/1988 | Watanabe et al. | |
| 4,768,144 A | 8/1988 | Winter et al. | |
| 4,774,664 A | 9/1988 | Campbell et al. | |
| 4,792,849 A | 12/1988 | McCalley et al. | |
| 4,799,156 A | 1/1989 | Shavit et al. | |

(Continued)

FOREIGN PATENT DOCUMENTS

EP    0 217 351    4/1987

(Continued)

OTHER PUBLICATIONS

Cybertalk Comparative shopping services have a long way to go, Timothy C. Barmann, Providence Sunday Journal. Providence, R.I.: Dec. 6, 1998. p. E.02, downloaded from ProQuest Direct on the Internet on Aug. 22, 2008, 5 pages.*

(Continued)

*Primary Examiner* — James Zurita
(74) *Attorney, Agent, or Firm* — Baker & Daniels LLP

(57) ABSTRACT

An apparatus and method is disclosed for the comparison of a plurality of selected products on the display of a remote computer. In one example, a product image of each of the selected products is combined with a background image for presentation on the display of the remote computer.

66 Claims, 14 Drawing Sheets

U.S. PATENT DOCUMENTS

| | | | |
|---|---|---|---|
| 4,800,488 | A | 1/1989 | Agrawal et al. |
| 4,819,159 | A | 4/1989 | Shipley et al. |
| 4,825,354 | A | 4/1989 | Agrawal et al. |
| 4,827,330 | A | 5/1989 | Walsh et al. |
| 4,833,625 | A | 5/1989 | Fisher et al. |
| 4,845,634 | A | 7/1989 | Vitek et al. |
| 4,853,843 | A | 8/1989 | Ecklund |
| 4,860,123 | A | 8/1989 | McCalley et al. |
| 4,868,866 | A | 9/1989 | Williams, Jr. |
| 4,887,204 | A | 12/1989 | Johnson et al. |
| 4,891,503 | A | 1/1990 | Jewell |
| 4,893,307 | A | 1/1990 | McKay et al. |
| 4,897,781 | A | 1/1990 | Chang et al. |
| 4,901,223 | A | 2/1990 | Rhyme |
| 4,905,094 | A | 2/1990 | Pocock et al. |
| 4,914,587 | A | 4/1990 | Clouse |
| 4,918,588 | A | 4/1990 | Barrett et al. |
| 4,928,233 | A | 5/1990 | Millis |
| 4,931,929 | A | 6/1990 | Sherman |
| 4,937,760 | A | 6/1990 | Beitel et al. |
| 4,941,040 | A | 7/1990 | Pocock et al. |
| 4,943,707 | A | 7/1990 | Boggan |
| 4,949,248 | A | 8/1990 | Caro |
| 4,954,697 | A | 9/1990 | Kokubun et al. |
| 4,973,952 | A | 11/1990 | Malec et al. |
| 4,975,840 | A | 12/1990 | DeTore et al. |
| 4,980,826 | A | 12/1990 | Wagner |
| 5,008,853 | A | 4/1991 | Bly et al. |
| 5,014,125 | A | 5/1991 | Popock et al. |
| 5,101,444 | A | 3/1992 | Wilson et al. |
| 5,142,662 | A | 8/1992 | Gump et al. |
| 5,182,770 | A | 1/1993 | Medveczky et al. |
| 5,196,838 | A | 3/1993 | Meier et al. |
| 5,235,509 | A | 8/1993 | Mueller et al. |
| 5,276,883 | A | 1/1994 | Halliwell |
| 5,319,542 | A | 6/1994 | King, Jr. et al. |
| 5,361,393 | A | 11/1994 | Rossillo |
| 5,423,033 | A | 6/1995 | Yuen |
| 5,440,479 | A | 8/1995 | Hutton |
| 5,473,772 | A | 12/1995 | Halliwell et al. |
| 5,485,174 | A | 1/1996 | Henshaw et al. |
| 5,515,268 | A | 5/1996 | Yoda |
| 5,528,490 | A | 6/1996 | Hill |
| 5,535,407 | A | 7/1996 | Yanagawa et al. |
| 5,544,303 | A | 8/1996 | Maroteaux et al. |
| 5,577,244 | A | 11/1996 | Killebrew et al. |
| 5,858,866 | A | 12/1996 | Miller et al. |
| 5,592,378 | A | 1/1997 | Cameron et al. |
| 5,646,992 | A | 7/1997 | Subler et al. |
| 5,664,111 | A | 9/1997 | Nahan et al. |
| 5,710,887 | A | 1/1998 | Chelliah et al. |
| 5,721,832 | A | 2/1998 | Westrope et al. |
| 5,758,327 | A | 5/1998 | Gardner et al. |
| 5,761,649 | A | 6/1998 | Hill |
| 5,870,717 | A * | 2/1999 | Wiecha ............................ 705/26 |
| 5,884,309 | A * | 3/1999 | Vanechanos, Jr. .............. 707/10 |
| 5,970,471 | A | 10/1999 | Hill |
| 6,029,142 | A | 2/2000 | Hill |
| 6,067,525 | A | 5/2000 | Johnson et al. |

FOREIGN PATENT DOCUMENTS

| | | |
|---|---|---|
| EP | 0 284 924 | 10/1988 |
| EP | 0 290 828 | 11/1988 |
| EP | 0 323 707 | 7/1989 |
| EP | 0 396 834 | 11/1990 |

OTHER PUBLICATIONS

"The Handbook, Find Out How to Get the Most Out of Prodigy", Prodigy Services Company, Copyright, 1990, 1991.

"The Handbook For Your Software Upgrade", Prodigy Services Company, Copyright 1990.

Terry, D.B., "Caching Hints in Distributed Systems, IEEE Transactions on Software Engineering", vol. SE-13, No. 1, Jan. 1987.

Chorafas, D.N., "Databases for Networks and Minicomputers", Copyright 1982, Petrocelli Books, Inc., ISBN 0-89433-136-1, pp. 83-86.

Lorin, H., "Aspects of Distributed Computer Systems", Copyright 1980 by John Wiley & Sons, Inc., ISBN 0-471-08114-0.

Garcia-Molina, Hector, "Reliability Issues for Completely Replicated Distributed Databases", Tutorial Distributed Processing, Third Ed., LOC 80-85249, IEEE Computer Society Press, 1981, pp. 529-536.

Wong, "Dynamite Re-Materialization: Processing Distributed Queries Using Redundant Data", Fifth Berkeley Workshop on Distributed Data Management and Computer Networks, LBL-11860UC-32 CONF-810202, Feb. 3-5, 1981, pp. 3-13.

Strom, "Consistency of Redundant Databases in a Weakly Coupled Distributed Computer Conferencing System", Fifth Berkeley Workshop on Distributed Data Management and Computer Networks, LBL-11860UC-32 CONF-810202, Feb. 3-5, 1981, pp. 143-153.

Parker, et al., "Detection of Mutual Inconsistency in Distributed Systems", Fifth Berkeley Workshop on Distributed Data Management and Computer Networks, LBL-11860UC-32 CONF-810202, Feb. 3-5, 1981, pp. 172-183.

Apers, "Redundant Allocation of Relations in a Communications Network" Fifth Berkeley Workshop on Distributed Data Management and Computer Networks, LBL-11860UC-32 CONF-810202, Feb. 3-5, 1981, pp. 245-247.

Gecsci, "The Architecture of Videotex Systems", Chapter 6—"Topology of Videotex Networks", Prentice-Hall, 1983.

Tanenbaum, Andrew S., "Computer Networks", Chapter 10—"The Application Layer", Prentice-Hall, 1981, pp. 440-444.

Bernstein, et al., "The Concurrency Control Mechanism of SDD-1: A System for Distributed Databases", IEEE Transactions on Software Engineering, vol. SE-4, No. 3, May 1978, pp. 154-168.

Parker, et al., "Detection of Mutual Inconsistency in Distributed Systems", IEEE Transactions on Software Engineering, vol. SE-9, No. 3, May 1983, pp. 240-247.

Ceri, et al., "Distribution Design of Logical Database Schemas", IEEE Transactions on Software Engineering, vol. SE-9, No. 4, Jul. 1983, pp. 487-504.

Gray, "An Approach to Decentralized Computer Systems", IEEE Transactions on Software Engineering, vol. SE-12, No. 6, Jun. 1986, pp. 684-692.

Weihl, "Distributed Version Management for Read-Only Actions", IEEE Transactions on Software Engineering, vol. SE-13, No. 1, Jan. 1987, pp. 55-64.

Terry, "Caching Hints in Distributed Systems", IEEE Transactions on Software Engineering, vol. SE-13, No. 1, Jan. 1987, pp. 48-54.

Sarin, "Discarding Obsolete Information in a Replicated Database System", IEEE Transactions on Software Engineering, vol. SE-13, No. 1, Jan. 1987, pp. 39-47.

Fuchs, et al., "Comparison and Diagnosis of Large Replicated Files", IEEE Transactions on Software Engineering, vol. SE-13, No. 1, Jan. 1987, pp. 15-22.

Weitzman, "Distributed Mico/Minicomputer Systems, Centralized versus Distributed Data Bases and/or Processing", Prentice-Hall, Inc., 1980, ISBN 0-13-2146481-7, pp. 5-6.

Viescas, "The Official Guide to the Prodigy Service", Microsoft Press, ISBN 1-55615-374-0, 1991.

Date, "An Introduction to Database Systems", vol. 11, Addison-Wesley System Programming Series, ISBN 0-201-14474-3, Jul. 1984.

Nielsen, "Finding it on the Internet: The Next Challenge for Librarianship", Database, vol. 13, Oct. 1990.

Berners-Lee, "Information Management: A Proposal", pp. 7040-7054, Mar. 1989, May 1990.

Berners-Lee, "The Enquire System Short Description", European Organisation for Nuclear Research, pp. 7085-7099, Oct. 1980.

Information Sciences Institute, "Transmission Control Protocol", DARPA Internet Program, Protocol Specification, pp. 1-77, Sep. 1981.

Jones, "MAP/TOP Networking", McGraw-Hill Book Company, pp. 22-43, 1988.

Trevor, "Personal Color Radar for the IBM Personal Computer", User's Manual, pp. 1-18, Sep. 7, 1983.

"Videolog$^{SM}$: The new instant access electronic medium", VideoLog Communications, pp. 1-4, 1984.

Viescas, "Prodigy Made Easy", Prodigy Services Company, 1991.

Gelenbe, et al., "Analysis of Update Synchronization for Multiple Copy Data-Bases", Proceedings of the Third Berkeley Workshop on Distributed Data Management and Computer Networks, pp. 5277-5299, Aug. 29-31, 1978.

Hendricks, "A Filesystem for Software Development", Sun Microsystems, Inc., USENIX Summer Conference, Jun. 11-15, 1990, Anaheim, California, pp. 333-340.

Walker, et al., "The LOCUS Distributed Operating System", acm Operating Systems Review, vol. 17, No. 5, Proceedings of the Ninth ACM Symposium on Operating Principles, Oct. 10-13, 1983.

Sheltzer, et al., "Internet Locus: Extending Transparency to an Internet Environment", IEEE Transactions on Software Engineering, vol. SE-12, No. 11, Nov. 1986.

Ellis, "A Robust Algorithm for Updating Duplicate Databases", Proceedings of the Second Annual Berkeley Workshop on Distributed Data Management and Computer Networks, pp. 146-158, May 1977.

Hac', et al., "Algorithms for File Replication in a Distributed System", J. Systems Software, pp. 173-181, 1991.

Carson, et al., "MicroLIAS: Beyond the Online Public Access Catalog", Library Hi Tech, Consecutive Issue 15, vol. 4, No. 3, Fall 1986.

Heinemann, "Auto-Graphics' AGILE II", Library Hi Tech, Consecutive Issue 13, vol. 4, No. 1, Spring 1986.

"The Newsletter for Members of the PRODIGY[SM] Interactive Personal Service", Prodigy Services Company, vol. I, No. 9, Oct. 17, 1988.

"The Newsletter for Members of the PRODIGY[SM] Interactive Personal Service", Prodigy Services Company, vol. 1, No. 11, Nov. 21, 1988.

"The Newsletter for Members of the PRODIGY[SM] Interactive Personal Service", Prodigy Services Company, vol. I, No. 12, Dec. 1988.

"The Newsletter for Members of the PRODIGY[SM] Interactive Personal Service", Prodigy Services Company, vol. II, No. 2, Mar. 1989.

Gecsei, "The Architecture of Videotex Systems", Prentice-Hall, Englewood Cliffs, New Jersey, 1983.

Garcia-Molina, "The Future of Data Replication", Fifth Symposium on Reliability in Distributed Software and Database Systems, IEEE Computer Society Order No. 690, IEEE Catalog No. 86CH2260-8, pp. 13-19, Jan. 13-15, 1986.

Banton, "An On-line Retail Collection Data System", Software—Practice and Experience, vol. 1, No. 3, pp. 235-243, 1971.

Van Dam, et al., "Intelligent Satellites for Interactive Graphics", Proceedings of the IEEE, vol. 62, No. 4, Apr. 1974.

Cerf, et al., "A Protocol for Packet Network Intercommunication", IEEE Transactions on Communications, vol. Com-22, No. 5, May 1974.

Slonim, et al., "Considerations for Determining the Degrees of Centralization or Decentralization in the Computing Environment", Information & Management, pp. 15-29, 1979.

Muro, et al., "Evaluation of the File Redundancy in Distributed Database Systems", IEEE Transactions on Software Engineering, vol. SE-11, No. 2, Feb. 1985.

Adiba, et al., "Database Snapshots", Sixth International Conference on Very Large Data Bases, Montreal, Canada, Oct. 1-3, 1980.

Nelson, "Using Prodigy", Que Corporation, 1990.

"Introducing the PRODIGY Service", Prodigy Services Company brochure, 1990-1991.

CompuServe Navigator[SM], User's Guide, CompuServe Incorporated, 1989.

"Prodigy Directory of JUMPword Listings", vol. 1, No. 2, Prodigy Interactive Personal Service, Winter 1989.

"Prodigy Interactive Personal Service Made Easy", Osborne McGraw-Hill, 1991.

Thomas, M. "Graphics Tools is low-cost, hearty image manager" InfoWorld, vol. 15, No. 41 (Oct. 11, 1993) p. 80.

"Multimedia authoring software; multimedia for the masses" InfoWorld, vol. 18, No. 4 (Jan. 22, 1996) p. 64.

"Intergraph Corp 2: Integraph introduces two rendering products for a range of users; ModelView Advantage" ModelView Professional (Mar. 13, 1995).

Marshall, P. "Photostyler" Version 2.0' InfoWorld, vol. 16, No. 25 (Jun. 20, 1994) p. 77.

Glass, B., "Dress up your VB apps" Info World, vol. 17, No. 18 (May 1, 1995) p. 74.

Irven et al., "Multi-Media Information Services: A Laboratory Study," Jun. 1988, IEEE Communications Magazine, vol. 26, No. 6, pp. 1 and 27-44.

Power browsing on the World Wide Web, Strauss, Howard. Campus—Wide Information Systems, Bradford: 1996. vol. 13, Iss. 3; p. 12, downloaded from ProQuest Direct on the Internet on Feb. 1, 2010, 8 pages.

* cited by examiner

| Order Pad | | | |
|---|---|---|---|
| Qty. | Style Number | Description | Metal Color |
| 1 | 35-779-1CT | | 14K Y |
| 1 | 35-487W | | 14K Y |
| 1 | 35-487MS | | 14K Y |

[Exit]  [Order]  [Inquire]  [? Help]

FIG. 14

VIRTUAL CATALOG AND PRODUCT PRESENTATION METHOD AND APPARATUS

CROSS-REFERENCE TO RELATED APPLICATION

This application is a continuation of U.S. application Ser. No. 09/406,477, filed Sep. 27, 1999 now abandoned which is a continuation of U.S. application Ser. No. 08/620,947, filed Mar. 22, 1996, now U.S. Pat. No. 5,970,471. The disclosure of U.S. application Ser. No. 09/406,477, filed Sep. 27, 1999 is expressly incorporated by reference herein.

BACKGROUND AND SUMMARY OF THE INVENTION

The present invention relates to an electronic catalog apparatus and method. More particularly, the present invention relates to a virtual product catalog and product inventory control and presentation apparatus and method.

The present invention provides a virtual product catalog and product presentation apparatus to assist with merchandising of products. One problem is common to the merchandising of all products. This problem is the inability to determine which categories of a product line will sell well at a particular store location. The result is that a product that sells well at one location may have a poor sales record at another location, such as in another city or on an other side of town. Since inventory turnover is the key to profits in retailing, this inability to forecast customer requirements accurately reduces profits for retailers.

Two common methods have been applied to attempt to reduce this problem. One method is to build "superstores" in order to assure product availability by offering a very large selection. The superstore provides a larger base of products in order to give the illusion of providing one-stop shopping to customers. Superstores, however, do not optimize inventory. A second method is to tailor product availability to regular customers of a specific store and to move product in and out of stock rapidly at each location based on customer demands. Both methods have had some success. This second method, typically called vertical or niche merchandising, does a better job of managing inventory while supplying regular customers with the products they require. The second method, however, has the disadvantage of making each store layout unique and having product availability which is inconsistent between stores.

The present invention is designed to provide a solution to the product merchandising problem. Throughout this specification, the present invention will be described in connection with jewelry industry products. It is understood, however, that the apparatus and method of the present invention may be used with any type of products. Therefore, the examples of jewelry industry products are for illustrative purposes only and are not intended to limit the scope of the present invention.

In the jewelry industry, purchasing decisions of customers are based largely upon visual appreciation of style and color. When a prospective customer enters a jewelry store, he or she approaches the showcase containing those pieces of specific interest, such as engagement rings, earrings, pendants, bracelets, necklaces, etc. The jeweler then brings a tray of items to the counter where one or more pieces of interest to the perspective customer are placed to the side for further study. The jeweler continues this process until a few pieces of particular interest have been gathered. At this point, the prospective customer's attention is focused on these few pieces and the jeweler can now bring closure to the sale. If the prospective customer does not find any of the in-stock items to be of interest, the jeweler can only suggest that the customer look at a competitors' in-stock products offering or look through several catalogs for something that more closely meets with the customers requirements.

Apparatus and method of the present invention, the shortcomings of the standard merchandising are overcome by providing an electronic image of the various products available to the customer using a computer at the store location. Unlike the limitations of physical space and financing imposed on in-stock inventory, a video catalog can offer a substantially greater number of product selections. In addition, the apparatus of the present invention provides an efficient and secure method of demonstrating products to the customer.

Using the apparatus of the present invention, the customer is led to a particular product category via a hierarchical menu structure. Once the product category is selected, the customer browses through various available items. The customer then selects products of interest by using a menu icon and a computer mouse input device or by touching the icon on the screen if the system utilizes a touch screen monitor. An image of each selected product item and its associated data are then placed in a separate review box on the computer screen for further review. As additional items of interest are found, these items may also be placed in remaining boxes. The number of review boxes for reviewing products is typically based on monitor and graphics resolution capabilities. Illustratively, four such review boxes are used for reviewing selected products. It is understood that more or less image boxes can be used depending upon the application and the available display technology.

One feature of this invention is the ability to select individual product items as they are displayed in image boxes and to move the selected product items to a separate review screen. This permits the customer to browse through multiple categories of items and move selected product items to a separate review screen for later inspection and side-by-side comparison to other selected product items. Once a few selected items of interest are moved to the review screen, again arbitrarily limited to four items, these items can be compared side-by-side for a quick decision of which item the customer would like to purchase. If the selected item for purchase is not in stock, the apparatus of the present invention generates an order form for electronic or manual delivery to the product vendor.

The present invention enables the jeweler to minimize actual in-stock inventory to only those items required to provide the prospective customer the look and feel of the quality of similar merchandise. At the same time, the jeweler can offer a very large selection of products and can demonstrate these products to customers quickly and efficiently. The present invention therefore improves the efficiency of product presentation, improves sales productivity, and provides means for implementing just-in-time inventory for the retail merchandiser.

The present invention also provides the operator with the ability to overlay an image of a product on a desired background. In merchandising, special days are used to help generate interest in a particular product. When advertising products for these special days or seasons, a merchandiser typically generates a flyer having pictures of the merchandise on a background illustrating or representing the particular holiday.

The present invention provides the operator the capability of dynamically applying a desired background to a product image. For instance, a Christmas scene may be dynamically applied as the background to a piece of jewelry that the retailer wishes to offer as a Christmas special. A different background can be applied for every day of the year to selected pieces of merchandise. This allows the merchandiser to have a virtual catalog where both the product selection and the product presentation can change on demand.

Techniques disclosed in U.S. Pat. No. 5,528,490 may be used to integrate and maintain static or constant data and variable data. The present invention uses a "map" to define the exact way a product image, product information, and background image are integrated together to provide a visual product presentation on the computer located at the store location. In addition, all components of the presentation image can be managed and maintained by a central server located at the vendor's corporate location. This allows corporate marketing and advertising departments to control and manage product presentation efficiently at each sales location.

According to one aspect of the present invention, a method is provided for presenting a plurality of product images for review by a user on a computer including a display, a memory, and an input device. The method includes the steps of displaying a plurality of product images on the display, providing product image review boxes on the display for a side-by-side comparison of selected product images, receiving a user input selecting a product image from the plurality of product images displayed on the display, and displaying the selected product image in one of the review boxes for a side-by-side comparison with at least one other selected product image.

In the illustrative method, the step of displaying a plurality of product images includes the step of displaying a scroll box on the display which includes the plurality of product images from the selected product category. The product images in the review boxes are typically larger than the product images in the scroll box. The selected product images are displayed in the next available review box until all the review boxes are filled with product images. The next selected product image replaces the product image in one of the review boxes. The user may select the review box in which to replace the product image after all the review boxes are filled with product images.

The illustrated method also includes the steps of receiving a user input to order a selected product displayed on the display, and automatically generating an order form for the selected product. The method further includes the step of automatically transmitting the order form for the selected product from the computer to a vendor's computer located at a remote location.

According to another aspect of the invention, a method is provided for presenting a plurality of product images for review by a user on a computer including a display, a memory, and an input device. The method includes the steps of displaying a menu including a plurality of available vendors on the display, receiving a user input selecting one of the vendors, displaying a product category menu on the display for products available from a selected vendor, receiving a user input selecting one of the product categories from the product category menu, and displaying a plurality of product images on the display from the selected product category. The method also includes the steps of providing at least two product image review boxes on the display for a side-by-side comparison of selected product images, receiving a user input selecting a product image from the plurality of product images displayed on the display, and displaying the selected product image in one of the display boxes for a side-by-side comparison with at least one other selected product image.

The product category menu is typically a hierarchical product category menu including at least two levels. In the illustrated method, the hierarchical product category menu includes three levels.

The illustrated method further includes the step of establishing a communication link between the computer and a vendor's computer located at a remote location after the desired product category is selected. The vendor's computer transmits variable data and updated constant data related to the plurality of products from the selected product category to the computer.

According to yet another aspect of the present invention, a method is provided for displaying a product image for review by a user on a computer including a display, a memory, and an input device. The method includes the steps of storing a plurality of product images in the memory of the computer, storing a plurality of background images in the memory of the computer, and selecting one of the background images to be displayed on the display with each product image. The method also includes the steps of receiving a user input to display a selected product image, and integrating the selected product image with the selected background image on the display to provide a customized product image on the display.

In one embodiment of the illustrated method, the product image and the selected background image are integrated based on a map transmitted to the computer from a vendor's computer located at a remote location. The step of storing a plurality of product images in the memory of the computer illustratively includes the steps of photographing the products against a black background, converting the photographic product image into a digital product image data format, changing any black pixels in the digital product image data to cyan pixels, and storing the modified product image data in the computer memory. The integrating step includes the step of overlaying the modified product image data over a selected background image on the display so that the cyan pixels in the modified product image data permit the background image to be displayed on the display.

According to a further aspect of the present invention, an apparatus is provided for presenting a plurality of product images for review by a user. The apparatus includes a computer including a display, a memory, and an input device. The apparatus also includes means for displaying a plurality of product images on the display, means for providing product image review boxes on the display for a side-by-side comparison of selected product images, means for receiving a user input selecting a product image from the plurality of product images displayed on the display, and means for displaying the selected product image in one of the review boxes for a side-by-side comparison with at least one other selected product image.

In the illustrated apparatus, the means for displaying a plurality of product images includes means for displaying a scroll box on the display which includes the plurality of product images from the selected product category. The product images in the review boxes are typically larger than the product images in the scroll box. The selected product images are displayed in the next available review box until all the review boxes are filled with product images. The next selected product image replaces the product image in one of the review boxes. In one embodiment, the user selects the review box in which to replace the product image after all the review boxes are filled with product images.

The illustrative apparatus further includes means for receiving a user input to order a selected product displayed on the display, and means for generating an order form for the selected product. The apparatus also includes means for transmitting the order form for the selected product from the computer to a vendor's computer located at a remote location.

According to a still further aspect of the present invention, an apparatus is provided for presenting a plurality of product images for review by a user. The apparatus includes a computer including a display, a memory, and an input device. The apparatus also includes means for displaying a menu including a plurality of available vendors on the display, means for receiving a user input selecting one of the vendors, means for displaying a product category menu on the display for products available from a selected vendor, means for receiving a user input selecting one of the product categories from the product category menu, and means for displaying a plurality of product images on the display from the selected product category. The apparatus further includes means for providing at least two product image review boxes on the display for a side-by-side comparison of selected product images, means for receiving a user input selecting a product image from the plurality of product images displayed on the display, and means for displaying the selected product image in one of the display boxes for a side-by-side comparison with at least one other selected product image.

One embodiment of the apparatus includes means for establishing a communication link between the computer and a vendor's computer located at a remote location after the desired product category is selected. The vendor's computer transmits variable data and updated constant data related to the plurality of products from the selected product category to the computer.

According to an additional aspect of the present invention, an apparatus is provided for displaying a product image for review by a user. The apparatus includes a computer including a display, a memory, and an input device. The apparatus also includes means for storing a plurality of product images in the memory of the computer, means for storing a plurality of background images in the memory of the computer, means for selecting one of the background images to be displayed on the display with each product image, means for receiving a user input to display a selected product image, and means for integrating the selected product image with the selected background image on the display to provide a customized product image on the display.

In the illustrated apparatus, the product image and the selected background image are integrated by the integrating means based on a map transmitted to the computer from a vendor's computer located at a remote location. The integrating means includes means for overlaying the product image over a selected background image on the display.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 14 is an order pad screen displayed on the computer for ordering products.

DETAILED DESCRIPTION OF DRAWINGS

Figure 1:
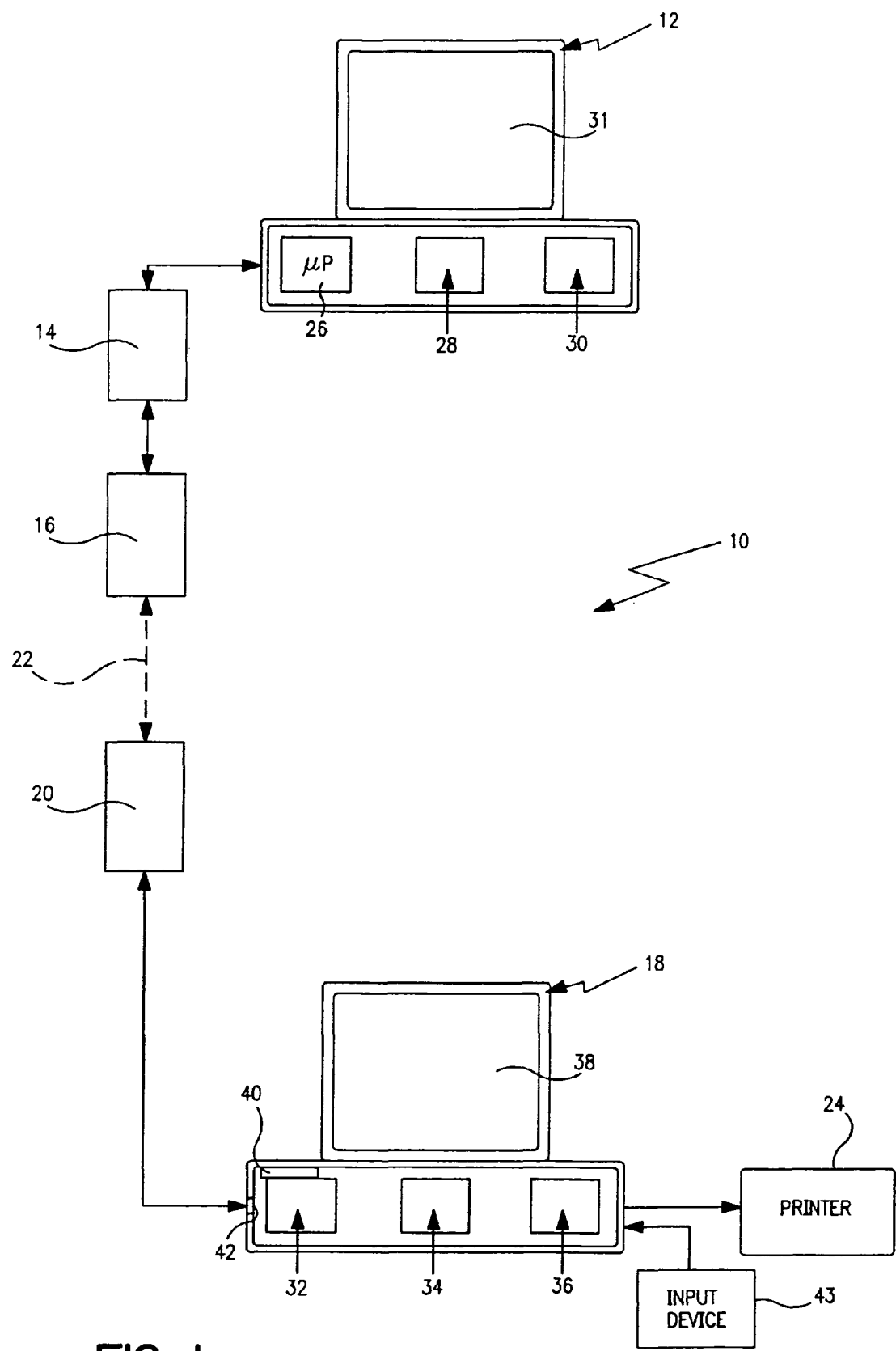
FIG. 1 is a diagrammatical view illustrating a connection between a computer at a sales location and to a vendor's computer in one embodiment of the electronic virtual catalog apparatus of the present invention.

Referring now to the drawings, FIG. 1 illustrates a block diagram of an electronic catalog system 10 of the present invention. Operation of the electronic catalog system 10 is described in detail in U.S. Pat. No. 5,528,490, which is expressly incorporated herein by reference. Catalog system 10 includes a vendor's computer or server 12 located at a vendor's place of business. The vendor's computer is coupled to a multi-port intelligent communications array 14 which is coupled to a modem 16. The catalog system 10 also includes a computer 18 located at a remote sales location. Computer 18 is also coupled to a modem 20 which communicates with modem 16 at the vendor's location via telephone communication lines 22.

Vendor's computer 12 includes a microprocessor 26, an internal RAM 28, a hard disk drive 30, and a graphics monitor 31. Computer 18 includes a microprocessor 32, an internal RAM 34, a hard disk drive 36, and a graphics monitor 38. Computer 18 is also coupled to a printer 24. The computer 18 further includes a floppy disk drive 40 and a serial communications port 42. Computer 18 also includes a user input device 43 such as a keyboard or mouse. A touch screen may also be used as an input device, if desired.

The computer 18 at the sales location is programmed with the software to provide a virtual catalog and product presentation apparatus for improved merchandising of the products to customers. While the illustrated embodiment of the present invention shows the computer 18 communicating with a vendor's server computer 12 at a remote location via modems 20 and 16, respectively, it is understood that other communication techniques can be used. For instance, communication between computer 18 and vendor's computer 12 may be accomplished through the Internet. In addition, for some applications, data can be supplied to the sales location computer 18 by the vendor by periodically sending updated data disks which are loaded into the memory of computer 18.

Figure 2:
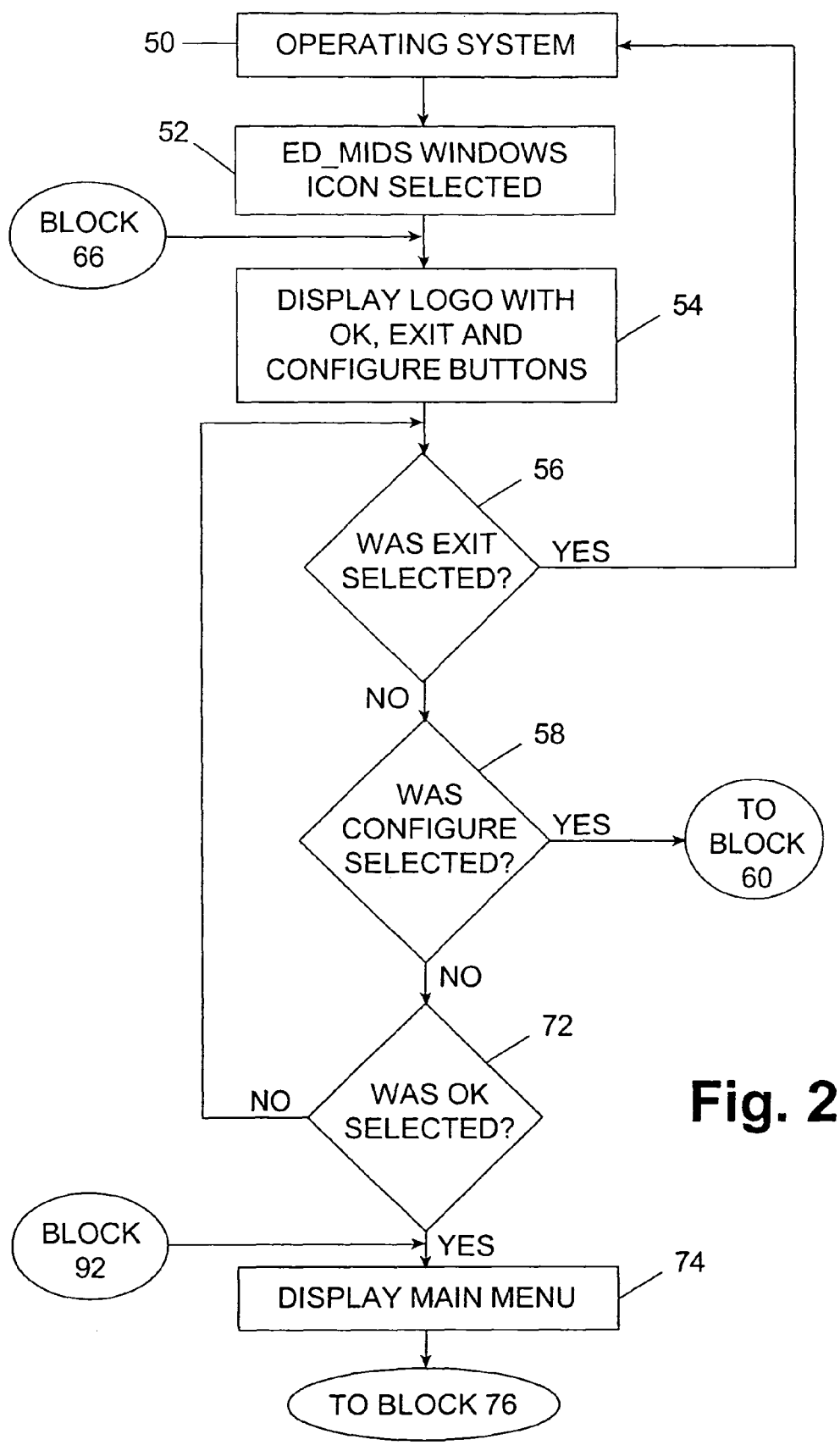
FIG. 2 is a flow chart illustrating the steps performed by the apparatus of the present invention after the software is accessed by the computer at the sales location.

In operation, the software program of the present invention is accessed from an operating system of computer 18 illustrated at block 50 of FIG. 2. Illustratively, the software package of the present invention is accessible from a windows operating system. Once the windows icon for the program of the present invention is selected at the block 52, computer 18 displays a logo of the ED-MIDS® Visual Order Entry$^{SM}$ software system along with option buttons labeled "OK," "Exit" and "Configure" as illustrated at block 54. An operator can then select the appropriate button using a standard mouse input computer device.

Computer 18 determines whether the Exit button was selected at block 56. If the Exit button was selected, the computer 18 returns to the operating system at block 50. If the Exit button was not selected at block 56, computer 18 proceeds to determine whether the configuration button was selected at block 58. If the Configure button was selected, computer 18 proceeds to block 60 of FIG. 3.

These screen fields include server connection with options for either a modem connection via some type of telephone service or a network connection via a local or wide area network. A network setting allows a user to select the drive letter designating the network connection. Modem settings include a choice of Tone or Pulse, Baud Rate, Comm Port, the telephone number, and a modem initialization string. To exit, the setup screen offers either an O.K. or Cancel option.

Figure 3:
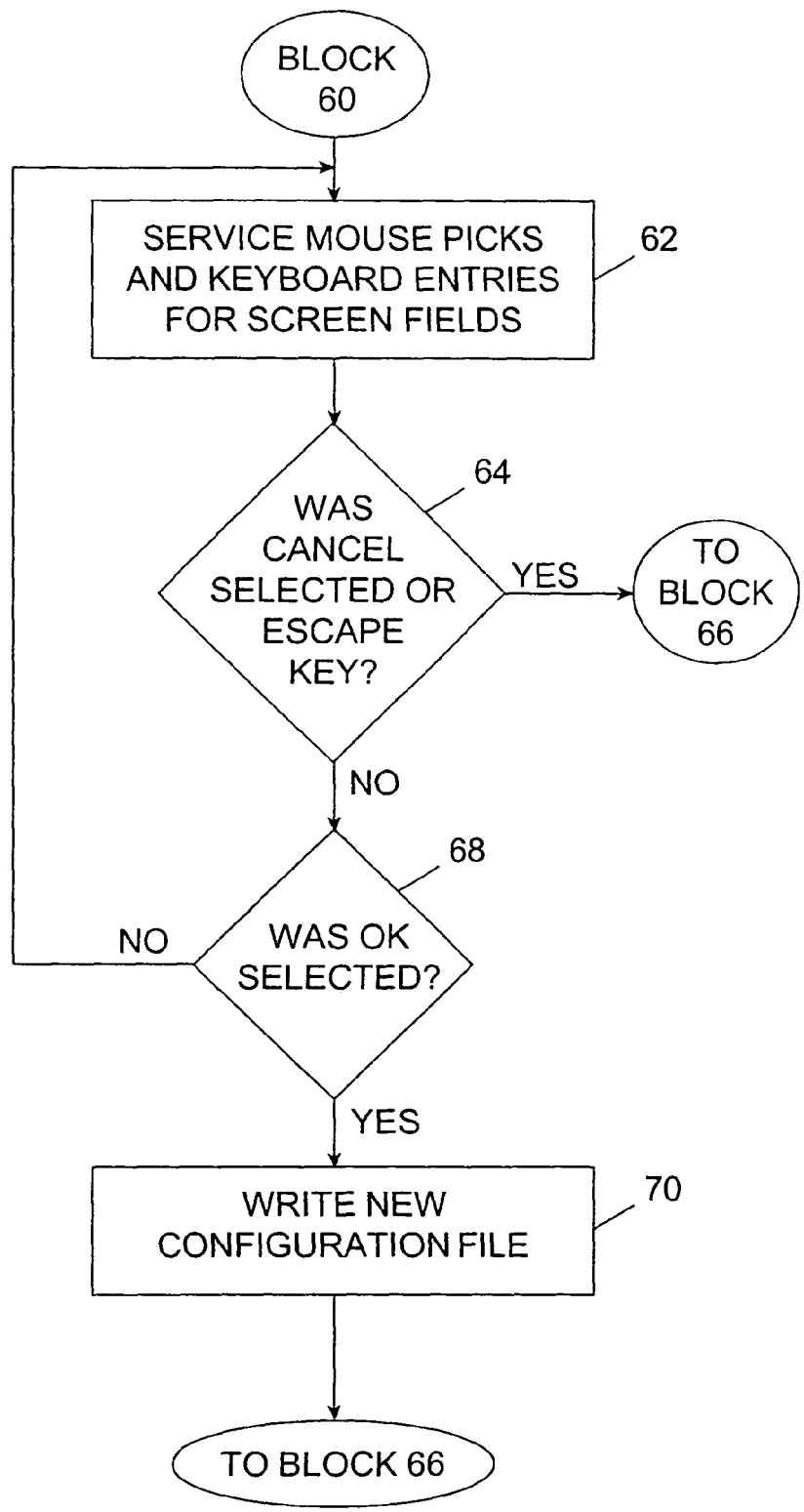
FIG. 3 is a flow chart of the steps performed by the apparatus for modifying a configuration file.

Computer 18 then services mouse picks and keyboard entries for screen fields as illustrated at block 62 in FIG. 3. Computer 18 then determines whether the cancel button was selected or the escape key was pushed at block 64. If so, computer 18 advances to block 66 in FIG. 2. If the cancel button or the escape key was not selected at block 64, computer 18 determines whether the OK button was selected as illustrated at block 68. If the OK button was not selected, computer 18 returns to block 62. If the OK button was selected, the computer 18 writes the new configuration file into the memory of computer 18 as illustrated at block 70. Computer 18 then returns to block 66 of FIG. 2.

Figure 4:
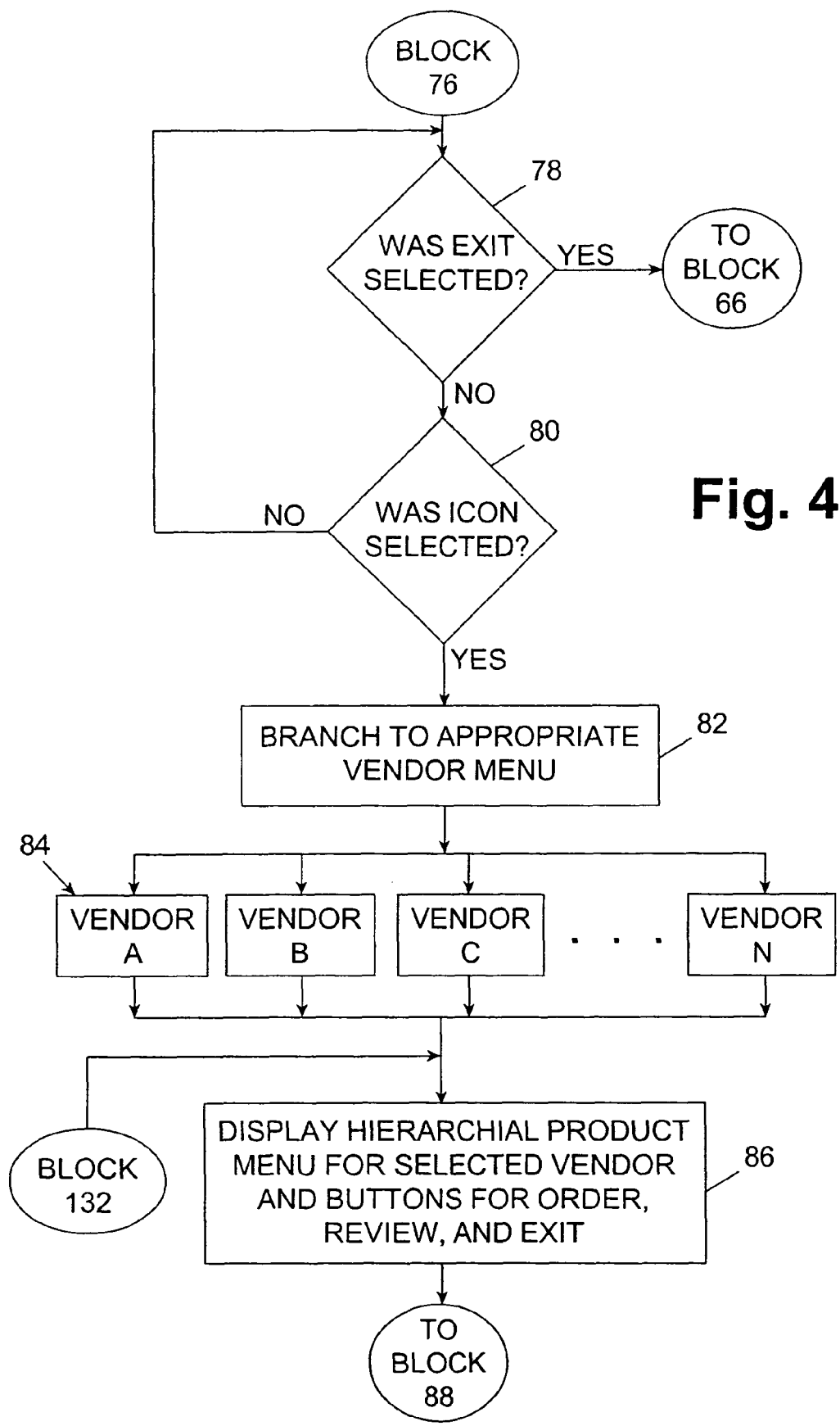
FIG. 4 is a flow chart of the steps performed by the apparatus to select a desired vendor from a menu of available vendors and then to display a hierarchical product menu for the selected vendor.

If the Configure button was not selected at block 58 of FIG. 2, computer 18 determines whether the OK button was selected as illustrated at block 72. If not, the computer 18 returns to block 56. If the OK button was selected at block 72, computer 18 displays a main menu of all available vendors as illustrated at block 74. Computer 18 then advances to block 76 of FIG. 4.

After the vendor list is displayed on monitor 38, computer 18 determines whether an exit button was selected at block 78. If so, computer 18 returns to block 66 of FIG. 2. If the Exit button was not selected, computer 18 determines whether an icon for a particular listed vendor was selected at block 80. If not, computer 18 returns to block 78. If a vendor icon was selected at block 80, computer 18 branches to an appropriate vendor menu as illustrated at block 82.

A plurality of different vendors a through N illustrated by blocks 84 may be provided. In the illustrated example of the jewelry industry, for instance, separate vendors may be accessed for mountings, findings, diamonds, gem stones, finished goods, etc. Once a desired vendor is selected, computer 18 displays a hierarchical product menu for the selected vendor. In addition, computer 18 displays option buttons including "Order," "Review" and "Exit" as illustrated at block 86.

Figure 6:
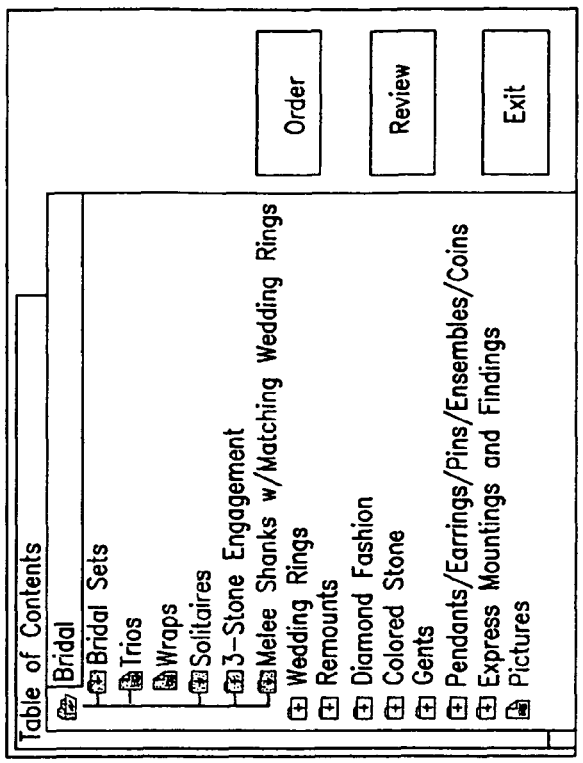
FIG. 6 is a sample screen display illustrating a second level of the product menu.
Figure 5:
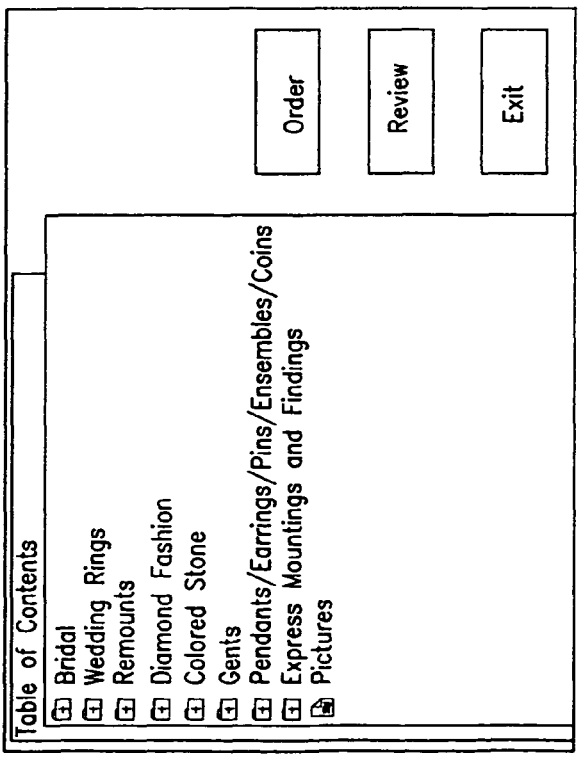
FIG. 5 is a sample screen display of a first level product menu, using jewelry as the illustrated product.
Figure 7:
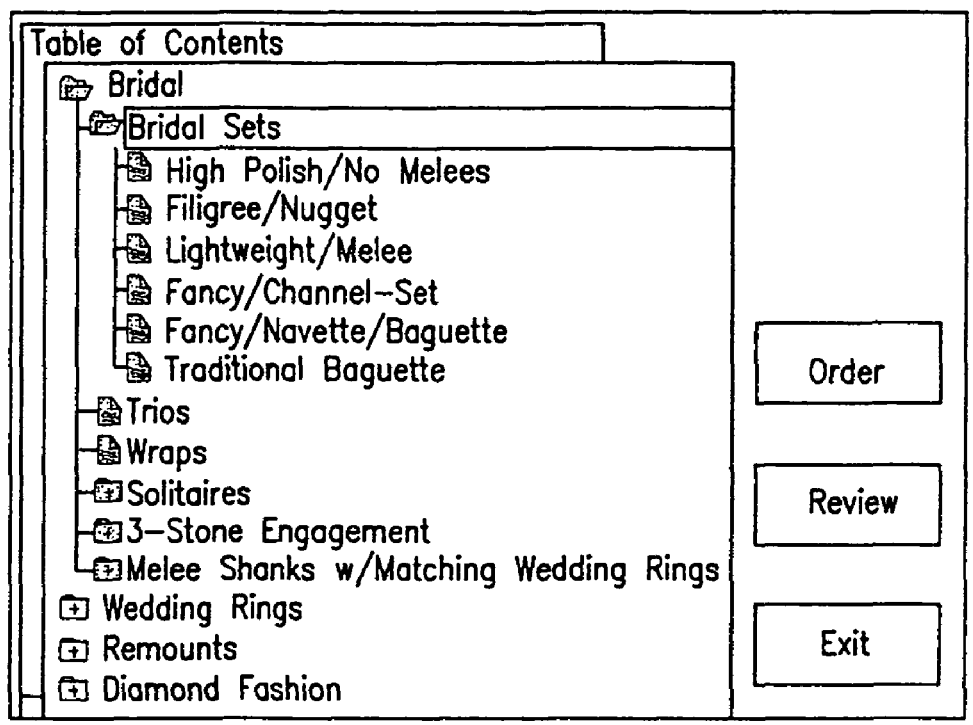
FIG. 7 is a sample screen display illustrating a third level of the product menu.
Figure 8:
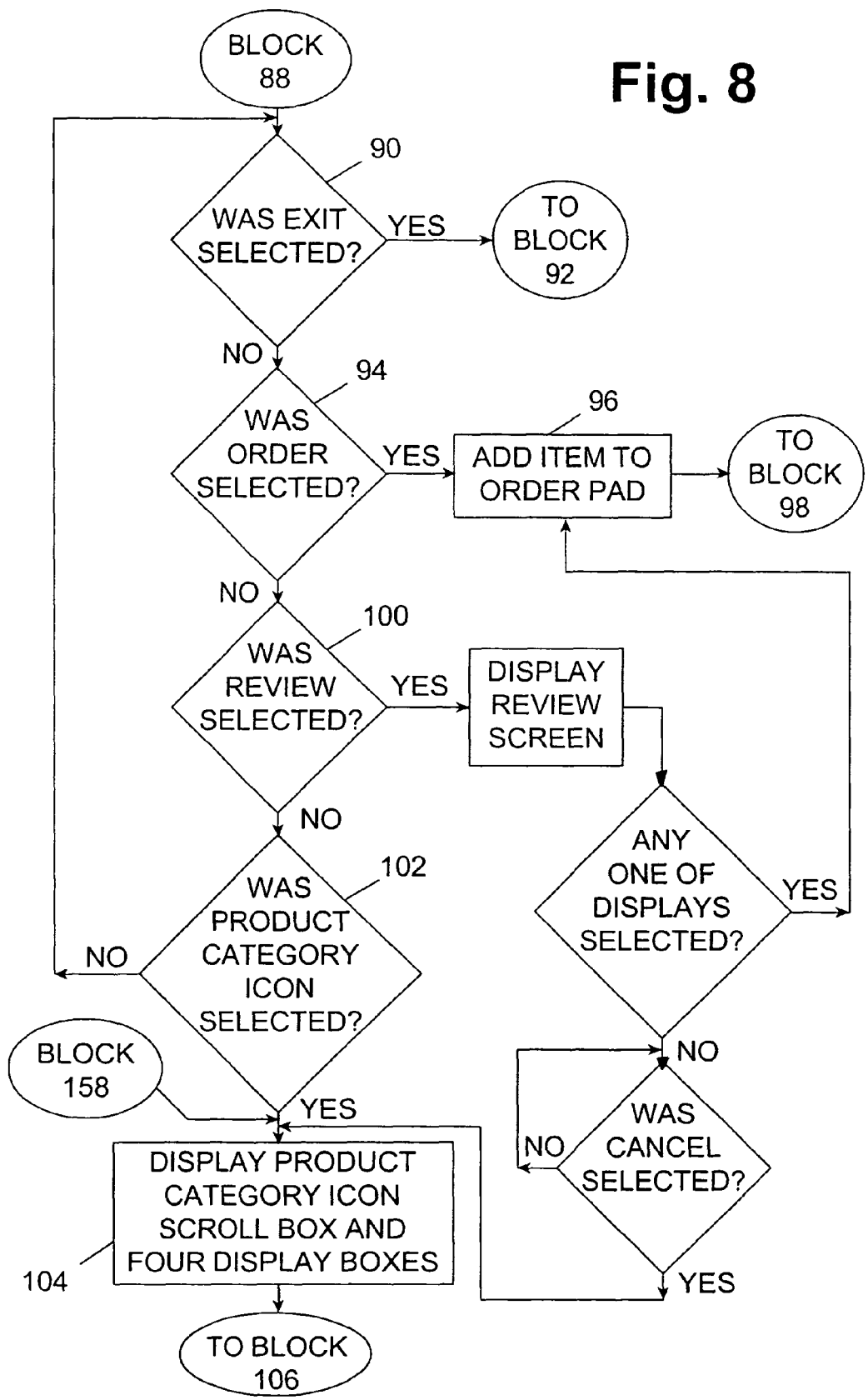
FIG. 8 is a flow chart illustrating the steps performed by the apparatus of the present invention for proceeding through the product menu screens.

Examples of such a hierarchical product menu are illustrated in FIGS. 57. FIG. 5 illustrates a first level menu for the illustrative products of jewelry available from a finished goods vendor. From the first level menu displayed by customers computer 18 on monitor 38, the operator can select the desired category of items. Once the category is selected, such as the "Bridal" category of FIG. 5, a second level menu is displayed as illustrated in FIG. 6. From within the second level menu an additional category of items may be selected. For instance "Bridal Sets" may be selected. A third level product menu is then displayed by customer computer 18 as illustrated in FIG. 7. Although the hierarchical menu product menu is not limited to three levels, selection criteria for most products selection criteria can be handled with three levels. Once the final level has been reached, computer 18 proceeds to block 88 of FIG. 8.

Computer 18 determines whether the Exit button was selected at block 90. If so, computer 18 advances to block 82 of FIG. 2. If the Exit button was not selected at block 90, computer 18 determines whether the Order button was selected as illustrated at block 94. If so, computer 18 adds the item to an order pad as illustrated at block 96 and then advances to block 98 of FIG. 15 as discussed in detail below.

If the Order button was not selected at block 94, computer 18 determines whether the Review button was selected at block 100. If the Review button was not selected, computer 18 determines whether a product category icon was selected at block 102. The product category icon can be selected using a computer mouse input device from the third level menu illustrated in FIG. 7. If the product category icon was not selected at block 102, computer 18 advances to block 90. If the product category icon was selected at block 102, computer 18 displays the product category icon scroll box and four separate display boxes for reviewing selected products as illustrated at block 104. Computer 18 then advances to block 106 of FIG. 10.

After the product category is selected, computer 18 can automatically dial up the vendor's server 12 as taught in U.S. Pat. No. 5,528,490. Vendor's server 12 can then transmit any variable product data to the computer 18 located at the remote sales location along with any updated constant or static data. The variable data may be pricing or available quantities or other textual data, for example. Constant data stored may be product image data and background image data, for example. In addition, as discussed in detail below, the vendor's server 12 can transmit a map for integrating the images of the products with selected background images in order to improve presentation of the products to a customer.

Figure 9:
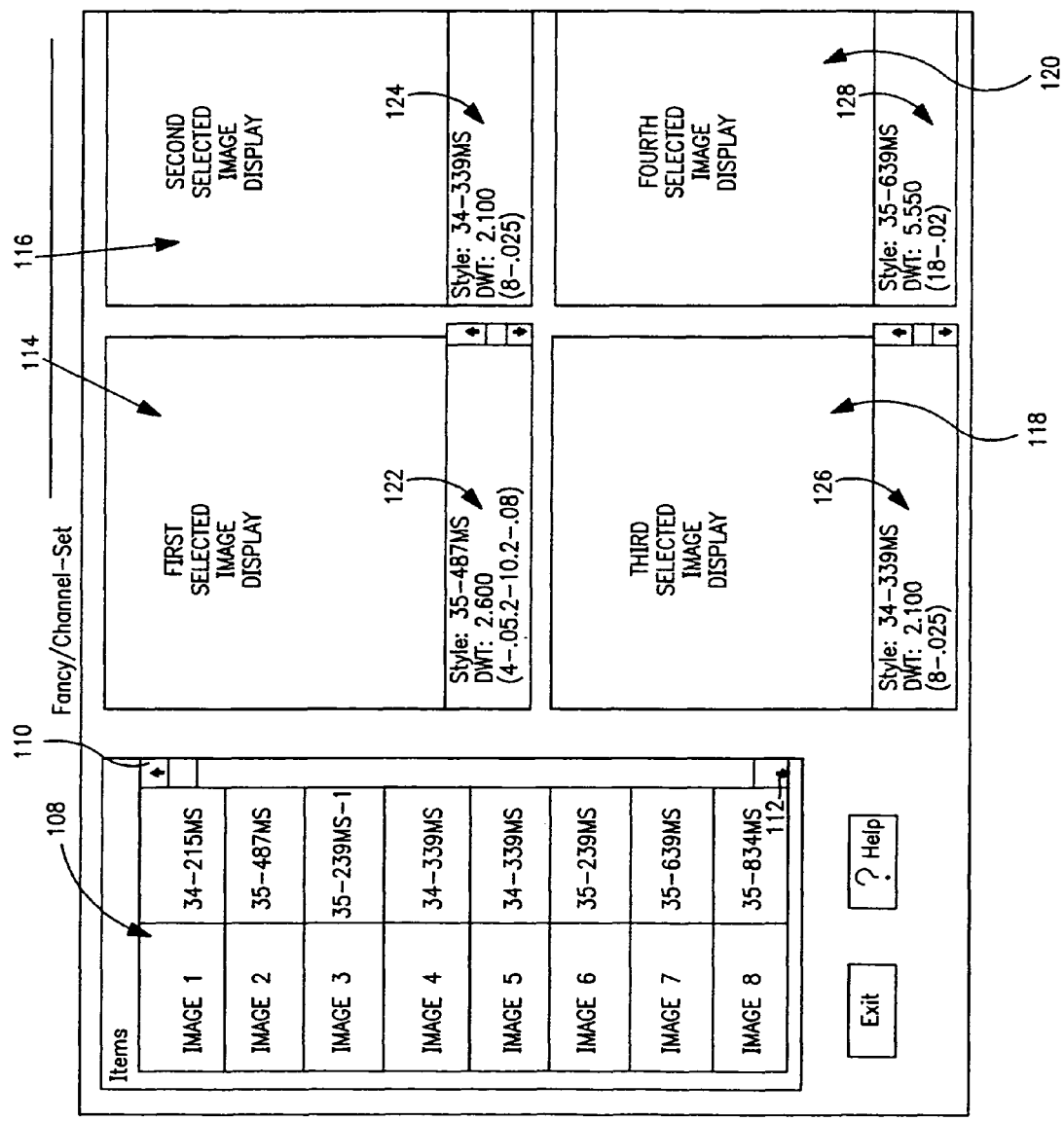
FIG. 9 is a display screen generated on the computer at the sales location which includes an icon scroll box for reviewing images of products available in a selected category and four larger display boxes for displaying product items selected from the scroll box.
Figure 12:
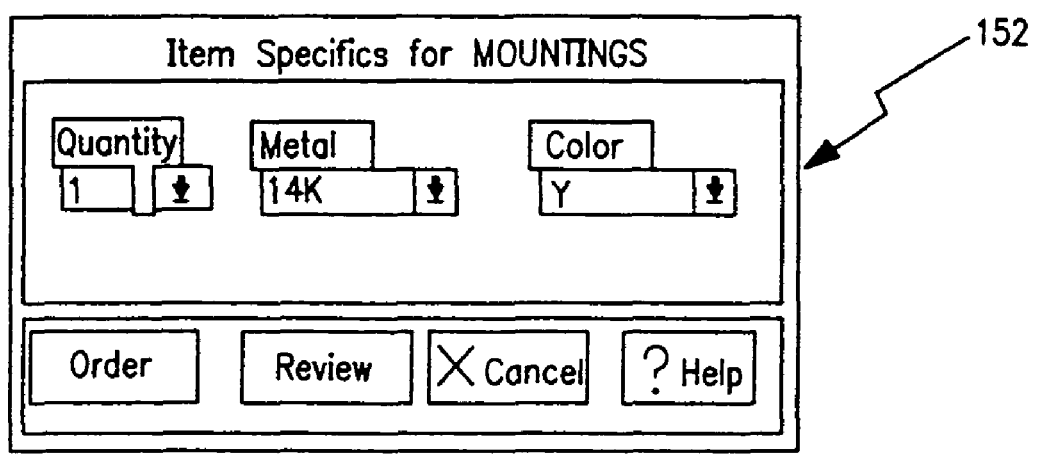
FIG. 12 is a sample screen displayed on the computer to order or review a selected item on the display screen.

FIG. 9 illustrates a screen display on monitor 38 of computer 18 of the product category icon menu scroll box 108 for an illustrative "Fancy Channel-Set" product category selected from the menu of FIG. 7. The product icon menu scroll box 108 displays a plurality of images along with textual data such as the model number for the available items in the selected product category. The operator can scroll through the icon menu scroll box 108 using arrows 110 and 112. The images 1-8 illustrated in FIG. 12 are actual photographic images of the jewelry items available for sale from the vendor. The displayed images may be larger, if desired. As the operator at the sales location scrolls through the product images in scroll box 108 the customer can select items of interest from the scroll box 108. Those selected items are moved to larger display boxes for review as also illustrated in the screen display of FIG. 9. In the illustrated embodiment, four such larger display boxes are provided. The larger images of the selected products are displayed in first, second, third, and fourth selected image display or review boxes 114, 116, 118, and 120, respectively. Below each of the images is an area for textual information related to the selected products at locations 122, 124, 126, and 128, respectively.

Figure 10:
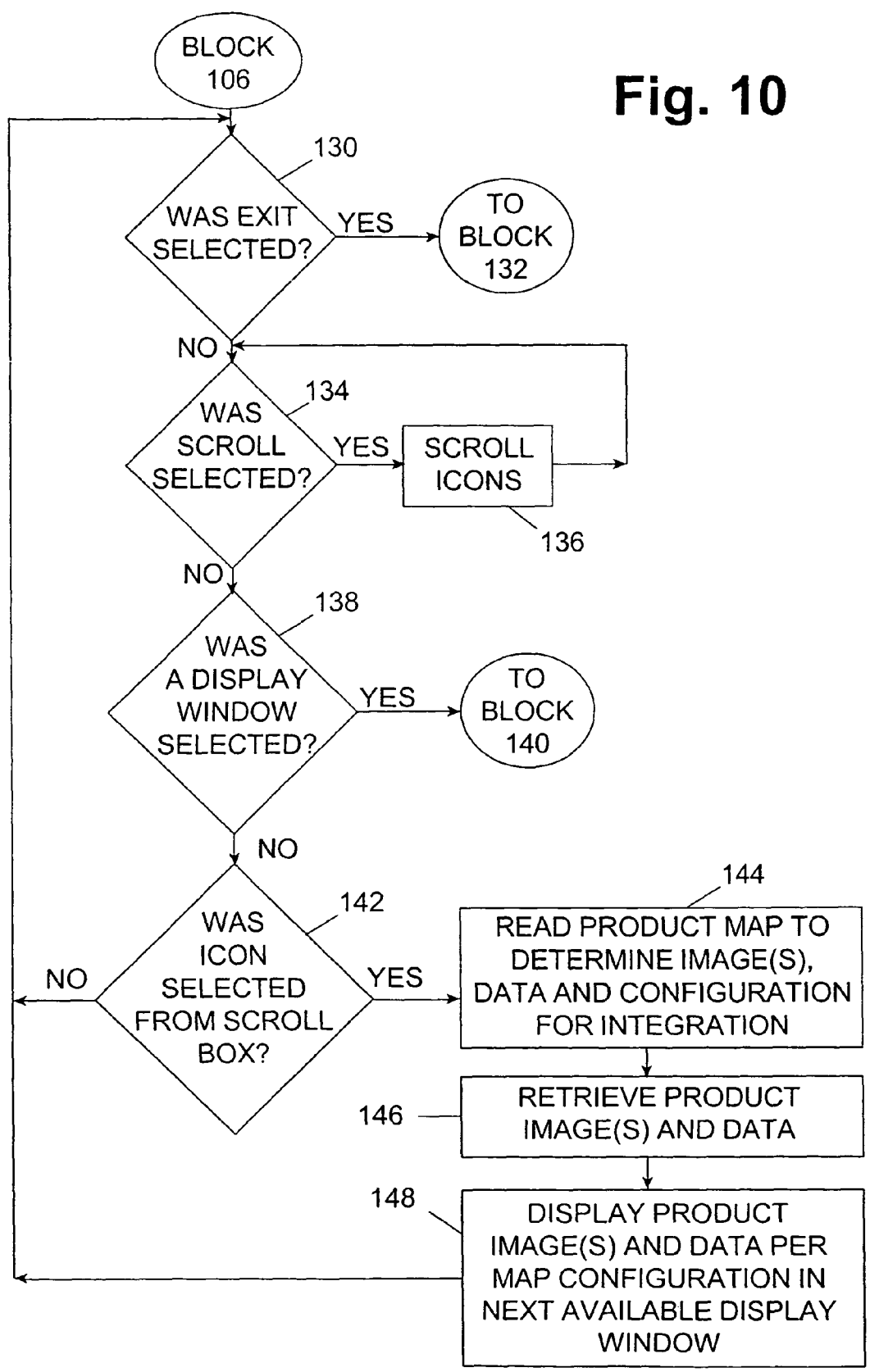
FIG. 10 is a flow chart illustrating the steps performed by the computer to scroll through the items in the selected product category and to display any selected items in the larger review boxes of the display screen.

After FIG. 9 is displayed on monitor 38 of computer 18, computer 18 determines whether the Exit button of FIG. 9 was selected as illustrated at block 130 of FIG. 10. If the Exit button was selected at block 130, computer 18 advances to block 132 of FIG. 4.

If the Exit button was not selected at block 130, computer 18 determines whether the scroll buttons 110 or 112 were selected at block 134. If so, computer 18 scrolls through the icons of product menu scroll box 108 to display the plurality of images and textual data associated with the available product images as illustrated at block 136. Computer 18 then returns to block 134.

If the scroll buttons 110 and 112 were not selected at block 134, computer 18 determines whether a particular display window 114, 116, 118, or 120 was selected as illustrated at block 138. If one of the larger display windows 114, 116, 118, or 120 was selected at block 138, computer 18 advances to block 140 of FIG. 11 as discussed in detail below. If a display window is not selected at block 138, computer 18 determines whether one of the product icons was selected from the scroll box 108 as illustrated at block 142 of FIG. 10. If not, computer 18 returns to block 130.

If one of the product icons was selected from the icon scroll box 108 illustrated in FIG. 9, the image and associated data for the selected product is displayed in the next available display box 114, 116, 118, or 120. A selected background is displayed behind the product image as discussed below. After four such products have been selected, and the product images and data are displayed, the next product selection replaces the first selected image in box 114. This is a continuous loop allowing user to always display four selected products simultaneously. Alternately, the customer may be given our option as to which of the review boxes 114, 116, 118, and 120 are replaced by the newly selected product.

By selecting one of the products in the icon scroll box 108, computer 18 accesses a "map" data base and determines the image or images, the data, and the configuration for the particular image display as illustrated at block 144 of FIG. 10. The data within this "map" record points to the product images, any additional data, and the configuration or background image to use to integrate the images and data. In other words, the product images can be displayed on differently designed backgrounds as discussed in detail below.

Computer 18 retrieves the product images and data from the computer memory as illustrated at block 146. Next, computer 18 displays the product images and data based on the map configuration in the next available display window 114, 116, 118, or 120 as illustrated at block 148 (or a customer selected display window).

At any time, the operator can select one of the four display windows 114, 116, 118, or 120 using the mouse input device. If computer 18 determines that a display window was selected at block 138 of FIG. 10, computer 18 advances to block 140 of FIG. 11. Selection of one of the display windows 114, 116, 118, or 120 causes an order and review box to be displayed as illustrated at block 150 of FIG. 11. A sample screen display of the order and review box is illustrated in FIG. 12. For example, the quantity, type of metal, color, or other parameters related to the products may be displayed as illustrated in section 152. Order and Review buttons are also provided.

Figure 11:
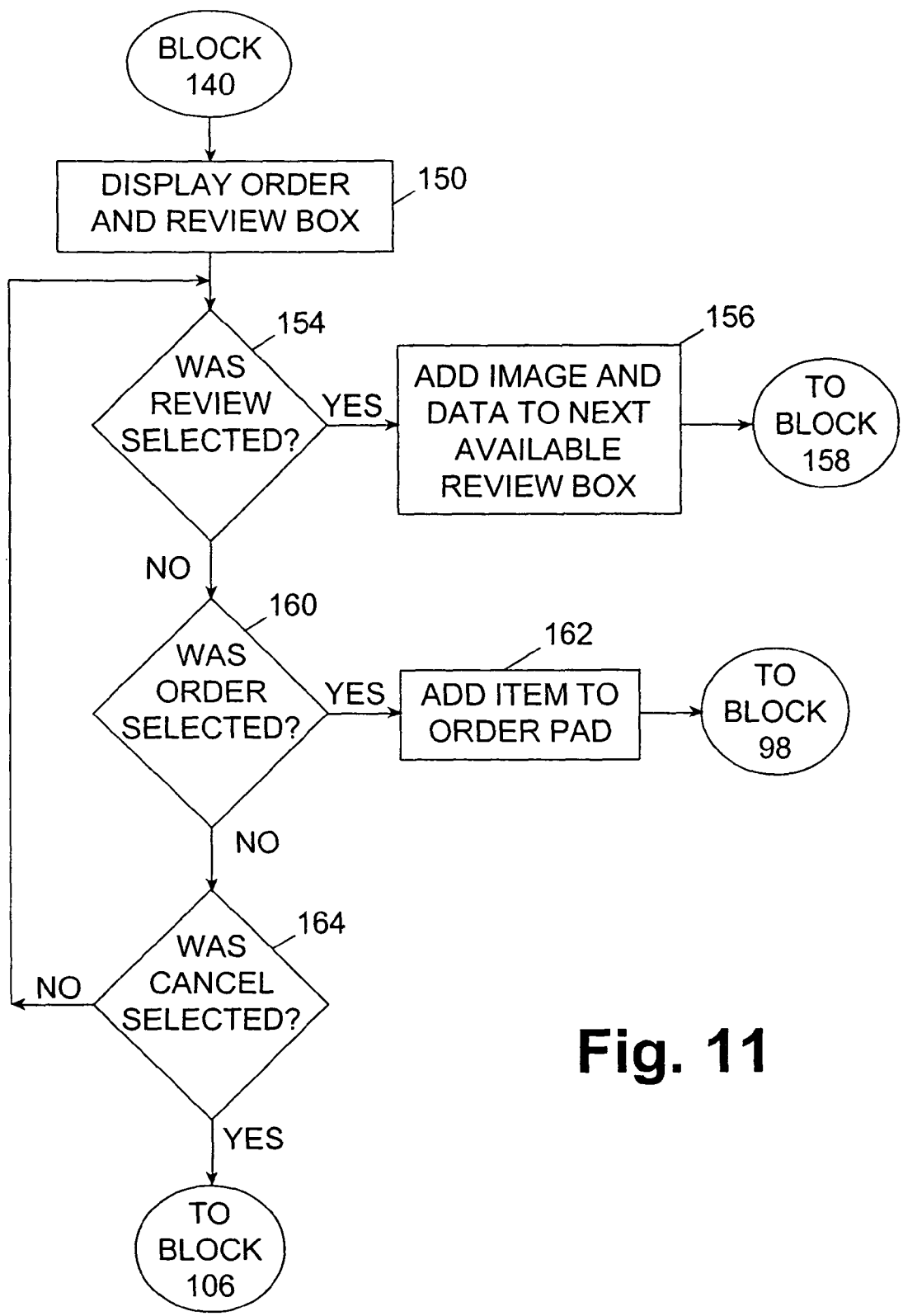
FIG. 11 is a flow chart illustrating the steps performed by the computer if an operator selects one of the display boxes of FIG. 9.

Computer 18 determines whether the Review button was selected from the screen of FIG. 12 as illustrated at block 154 of FIG. 11. If the Review button was selected, the product images and data are mapped to the next available display box 178, 180, 182, or 184 of FIG. 13 as illustrated at block 156. Computer 18 then advances to block 158 of FIG. 8.

If the Review button was not selected at block 154, computer 18 determines whether the Order button was selected from the screen of FIG. 12 as illustrated at block 160 in FIG. 11. If the Order button was selected, computer 18 adds the item to the order pad as illustrated at block 162 and then advances to block 98 of FIG. 15 as discussed below.

If the Order button was not selected at block 160, computer 18 determines whether the Cancel button was selected as illustrated at block 164. If not, computer 18 returns to block 154. If the Cancel button was selected at block 164, computer 18 advances to block 106 of FIG. 10.

Figure 13:
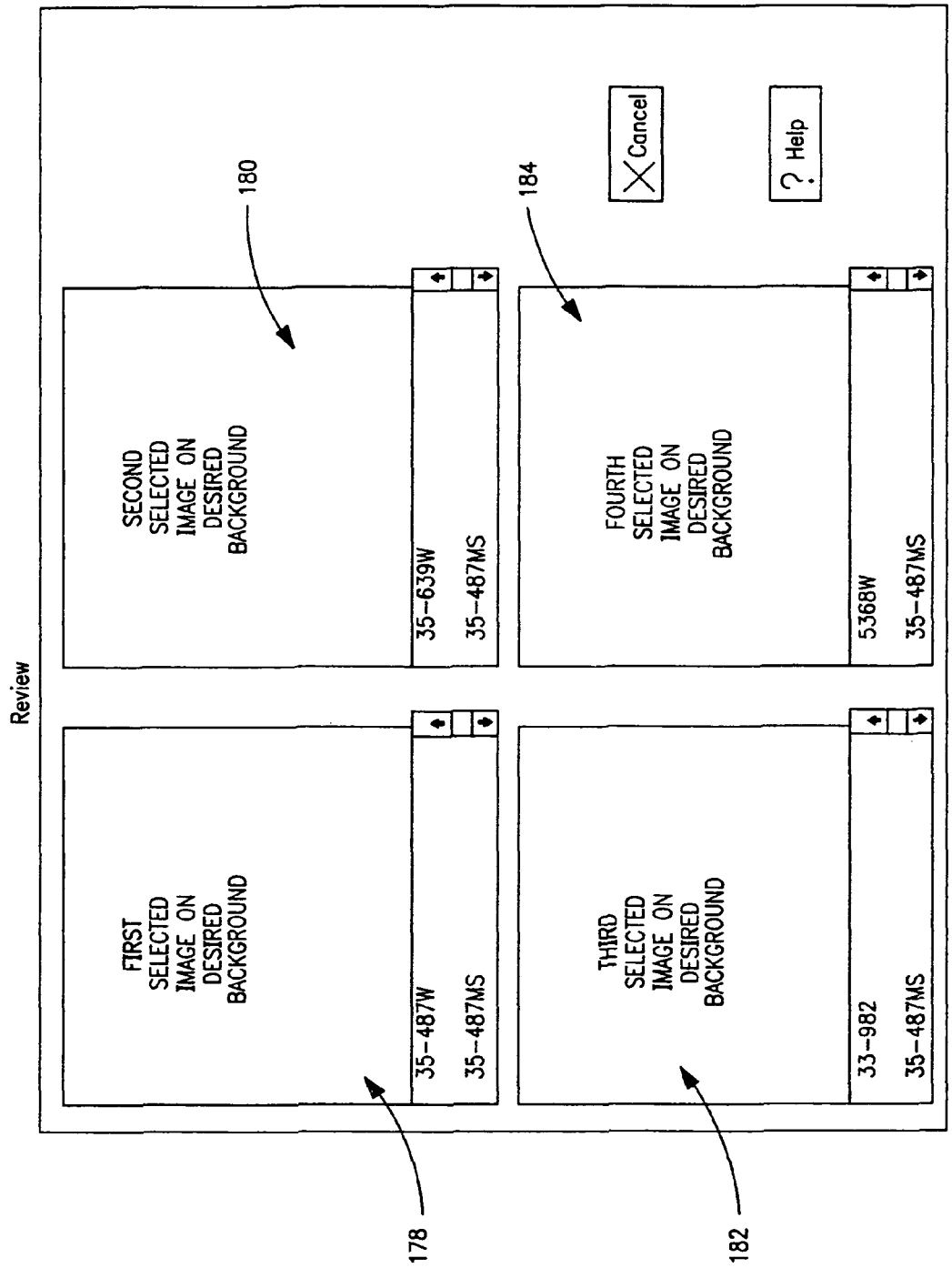
FIG. 13 is a screen displayed on the computer for reviewing selected images and data related to products selected and moved to the review boxes.

Anytime the review button is selected, computer 18 displays the four selected image display boxes 178, 180, 182, and 184 as illustrated in FIG. 13. This permits a side-by-side comparison of the particular products in which the customer is interested.

Figure 15:
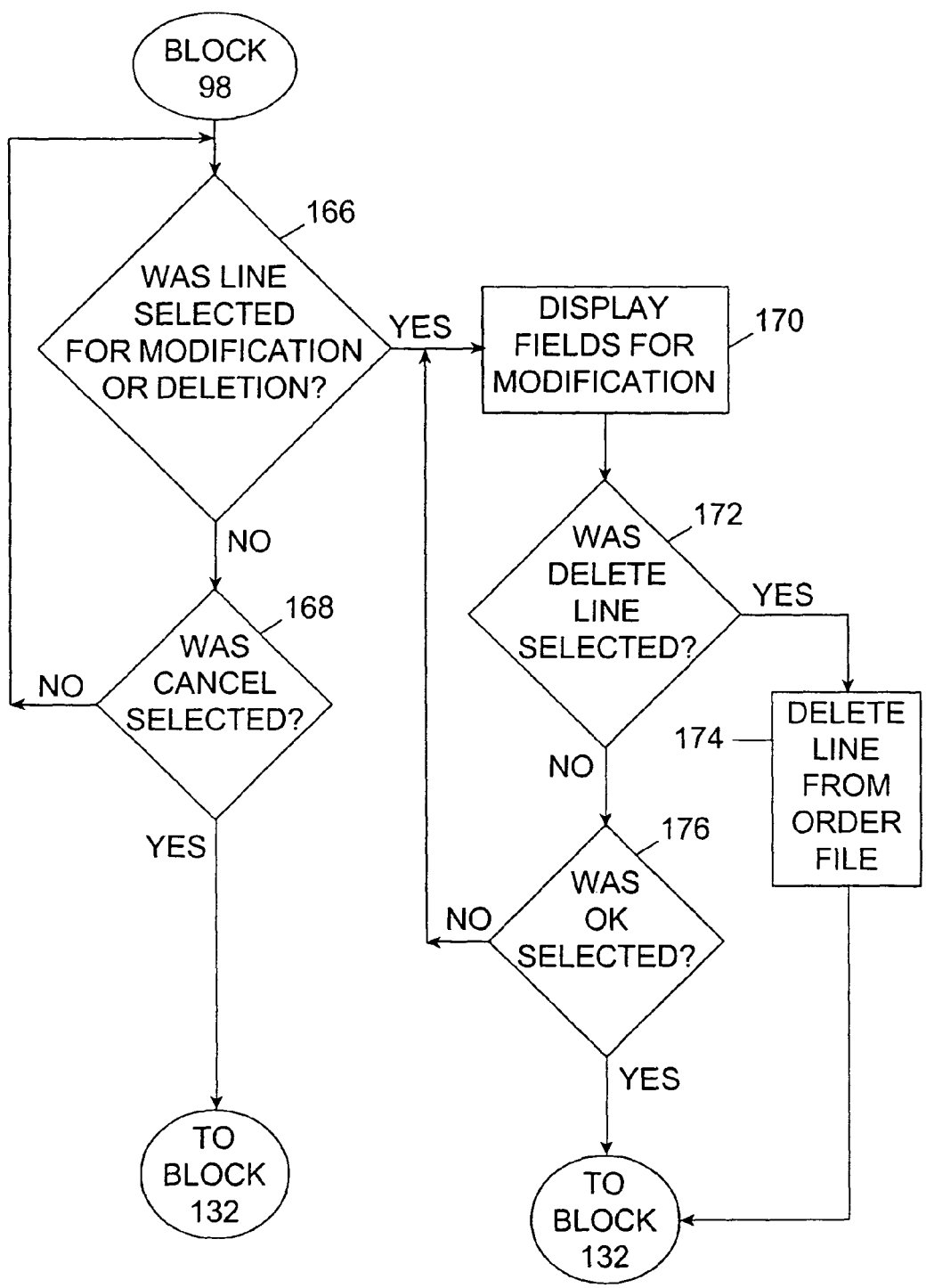
FIG. 15 is a flow chart illustrating the steps performed by the computer during the ordering process.

Referring now to FIGS. 14 and 15, FIG. 14 is a sample order pad display screen which computer 18 displays on monitor 38. The order pad lists quantity and style number for the various products which are to be ordered. Steps performed by the computer 18 are illustrated in FIG. 15. Computer 18 determines whether a line on the order pad on FIG. 14 was selected for modification or deletion as illustrated at block 166 of FIG. 15. If not, computer 18 determines whether the Cancel button was selected at block 168. If the Cancel button was not selected, computer 18 returns to block 166. If the Cancel button was selected at block 168, computer 18 advances to block 132 of FIG. 4.

If a line on the order pad was selected for modification or deletion at block 166, computer 18 displays fields for modification as illustrated at block 170. Computer 18 determines whether a delete line entry was selected at block 172. If so, computer 18 deletes the selected line from the order file as illustrated at block 174 and then returns to block 132 of FIG. 4. If a delete line was not selected at block 172, computer 18 determines whether an OK button was selected as illustrated at block 176. If not, computer 18 returns to block 170. If the OK was selected at block 176, computer 18 advances to block 132 of FIG. 4.

After particular items are selected for ordering, computer 18 can automatically transmit the order to the vendor's computer 12 through modem 20 as discussed above. In addition, computer can print out an order form on printer 24. The printed order form is then sent to the vendor.

The mapping feature of the present invention provides computer 18 with the ability to overlay an image on a desired background. In the present invention, a transparent solid background is provided for the stored image file related to a product item which is then overlaid on the desired background. In accordance with the present invention, a cyan background is used as the transparent color. The product images are photographed against a flat black background. The images of the products can be on film and converted to digital format by scanning or directly to a digital format using a digital camera. Once in a digital format, the images are electronically scanned. All the black pixels in the image are changed to cyan and stored. When the image is placed on top of a selected background image, the background shows through in any locations where there is a cyan pixel. The image of the product which is made up of pixels having colors other than cyan, is visible in the foreground of the image.

In merchandising, special days are used to help generate interest in products. For instance, Father's Day, Mother's Day, Valentine's Day, Thanksgiving, Christmas, etc. are all used for special product promotions. When advertising products for these special days, the merchandiser typically generates advertisements having themes associated with the particular event. The present invention provides the capability of dynamically applying a background to the image of a product to create an electronic virtual product catalog. Therefore, the background can be changed and dynamically applied to the product images, such as pieces of jewelry, that the retailer wishes to offer as a particular special. The mapping feature in which the product image data is mapped to a particular background scene can be accomplished entirely on the computer 18. In addition, the data related to the image data and background data can be updated and mapped from a vendors computer 12 using the techniques disclosed in U.S. Pat. No. 5,528,490, which is incorporated herein by reference. Using the concept of a "map" to define the exact way a product image, product information, and a background image are integrated, a desired product presentation image can be generated. In addition, all components of the presentation image can be managed and maintained by a central server such as vendor's computer 12. This allows the vendor's corporate marketing and advertising department to control and manage product presentation at each of its different sales locations efficiently.

Although the invention has been described in detail with reference to a certain preferred embodiment, variations and modifications exist within the scope and spirit of the present invention as described and defined in the following claims.

What is claimed is:

1. A method for providing product information related to a plurality of products from a vendor's computer to a remote computer including a display and an input device for review by a user, the method comprising:

storing product data including image data and textual data related to a plurality of products in a memory of the vendor's computer;

providing product data including image data and textual data related to a plurality of products from the memory of the vendor's computer to the remote computer for display on the display of the remote computer;

receiving at least one user input from the remote computer selecting at least two products associated with the image data and textual data related to the plurality of products displayed on the display of the remote computer for a comparison of the at least two products on the display of the remote computer;

providing updated product data associated with the at least two selected products from the memory of the vendor's computer to the remote computer if the product data previously provided to the remote computer is different from the updated product data, the updated product data being associated with the at least two selected products; and providing display instructions from the vendor's computer to the remote computer, the display instructions providing instructions operative to cause the remote computer to display image data and textual data related to the at least two selected products from at least one of the product data and the updated product data received from the vendor's computer as a side-by-side comparison on the display of the remote computer.

2. The method of claim 1, wherein the image data and textual data related to the at least two selected products is displayed in at least two side-by-side review boxes.

3. The method of claim 1, further comprising
receiving a user input requesting to order a selected product displayed on the display and generating an order form for the selected product for display on the display of the remote computer.

4. The method of claim 3, further comprising receiving order information selected through the order form from the remote computer at the vendor's computer.

5. The method of claim 3, wherein the order form includes a plurality of selected products.

6. The method of claim 1, wherein a scroll box is displayed on the display which includes product data related to the plurality of products.

7. The method of claim 1, further comprising providing data related to a plurality of product categories from the vendor's computer to the remote computer for display on the display of the remote computer as selection inputs for the plurality of product categories, receiving a user input selecting a product category from the plurality of product categories displayed on the display of the remote computer, and wherein the step of providing product data related to the plurality of products includes product data related to the selected product category.

8. The method of claim 1, wherein the display instructions are operative to cause an integration of the product data with a selected background image on the display.

9. The method of claim 1, wherein image data and textual data related to the plurality of products are displayed in a vertical listing on the display of the remote computer for review and selection at the remote computer by the user.

10. The method of claim 9, wherein the side-by-side comparison of the at least two selected products is displayed on a separate review area on the display of the remote computer from the vertical listing of image data and textual data related to the plurality of products.

11. The method of claim 10, wherein the separate review area on the display of the remote computer replaces the vertical listing of image data and textual data related to the plurality of products.

12. The method of claim 9, wherein product images in the side-by-side comparison are larger than product images in the vertical listing.

13. The method of claim 9, wherein in the vertical listing the image data is presented in a first column and the textual data is presented in a second column.

14. The method of claim 1, wherein the updated product data includes image data and textual data, the textual data including pricing information.

15. The method of claim 1, wherein the step of receiving at least one user input from the remote computer comprises receiving at least two product selections from selection inputs associated with the displayed image data for the at least two selected products from the product data displayed on the display of the remote computer.

16. The method of claim 15, wherein a computer mouse is used by a user to select the at least two products from the product data displayed on the display.

17. The method of claim 1, wherein the vendor's computer and the remote computer communicate via the internet.

18. The method of claim 1, wherein the side-by-side comparison includes a plurality of adjacent review areas, and wherein selected product image data is displayed in the next available review area until all the review areas are filled with product image data, and wherein image data related to the next selected product replaces the product image data in one of the review areas.

19. The method of claim 1, further comprising the step of providing from the vendor's computer to the remote computer instructions operative to cause a hierarchical menu of product categories to be displayed on the display of the remote computer, the hierarchical menu including at least two product categories.

20. The method of claim 19, wherein the hierarchical menu includes first, second, and third level product menus, the second level product menu being displayed in response to a selection of an item in the first level product menu, the third level product menu being displayed in response to a selection of an item from the second level product menu, and wherein the step of providing product data related to a plurality of products from the vendor's computer to the remote computer for display on the display occurs in response to selection of a category from the third level product menu.

21. The method of claim 1, wherein the image data related to the at least two selected products for side-by-side comparison are positioned on the display of the remote computer in a horizontal row and the textual data related to the selected products is positioned below the respective product image data.

22. The method of claim 1, further comprising providing a list of vendors from the memory of the vendor's computer to the remote computer, receiving a user input from the remote computer selecting at least one vendor, and wherein the step of providing product data related to a plurality of products from the vendor's computer to the remote computer for display on the display includes providing product data related to a plurality of products available from the selected vendor.

23. The method of claim 1, wherein the step of providing display instructions from the vendor's computer to the remote computer comprises providing a map from the vendor's computer to the remote computer to permit the remote computer to integrate the image data and textual data on the display of the remote computer.

24. The method of claim 1, wherein the vendor's computer is a server.

25. The method of claim 1, wherein the vendor's computer is located at the vendor's place of business.

26. The method of claim 1, wherein the image data related to the at least two selected products in the updated product data is different from the image data in the product data related to the plurality of products.

27. The method of claim 1, further comprising the steps of:
receiving an additional user input from the remote computer selecting a replacement product which replaces one of the at least two products for a comparison of the replacement product with the other products of the at least two products on the display of the remote computer;
providing updated product data, if necessary, from the memory of the vendor's computer that is associated with the replacement product to the remote computer and providing display instructions from the vendor's computer to the remote computer, the display instructions providing instructions operative to cause the remote computer to display the image data and the textual data related to the replacement product from at least one of the product data and the updated product data received from the vendor's computer as a side-by-side comparison on the display of the remote computer along with the other selected products.

28. The method of claim 1, wherein the image data related to the at least two selected products in the updated product data is different from the image data in the product data related to the plurality of products.

29. The method of claim 1, wherein the updated product data includes pricing information and the display instructions cause the pricing information to be displayed in the side-by-side comparison.

30. A system for providing product information related to a plurality of products from a vendor's computer to a remote computer through a communication link, the remote computer including a display and an input device for review by a user, the system comprising:
a processor;
at least one memory accessible by the processor; and
a communication device which provides a connection to the communication link;
wherein the at least one memory includes product data including image data and textual data related to a plurality of products;
software executable by the processor for providing product data including image data and textual data related to a plurality of products from the vendor's computer to the remote computer for display on the display;
software executable by the processor for receiving at least one user input from the remote computer selecting at least two products associated with the image data and textual data related to the plurality of products displayed on the display of the remote computer for comparison on the display of the remote computer;
software executable by the processor for determining product data stored in the memory of the vendor's computer that is associated with each of the at least two selected products; and
software executable by the processor for providing display instructions from the vendor's computer to the remote computer to permit the remote computer to combine the image data and the textual data related to the at least two selected products from the product data received from the vendor's computer to display both image data and textual data product information related to the at least two selected products for a side-by-side comparison on the display of the remote computer.

31. The system of claim 30, wherein the image data and the textual data related to the at least two selected products are displayed in at least two side-by-side review boxes.

32. The system of claim 30, further comprising software executable by the processor for receiving a user input to order a selected product displayed on the display and software executable by the processor for generating an order form for the selected product for display on the display of the remote computer.

33. The system of claim 32, further comprising software executable by the processor for providing order information selected through the order form from the remote computer to a vendor's computer.

34. The system of claim 30, further comprising software executable by the processor for providing data related to a plurality of product categories from the vendor's computer to the remote computer for display on the display, and software executable by the processor for receiving a user input selecting a product category from the plurality of product categories displayed on the display, and software executable by the processor for transmitting product data related to the selected product category from the vendor's computer to the remote computer for display on the display.

35. The system of claim 30, wherein the display instructions permit integration of the product data with a selected background image on the display.

36. The system of claim 30, wherein image data and textual data related to the plurality of products are displayed in a vertical listing on the display of the remote computer for review and selection at the remote computer by the user.

37. The system of claim 36, wherein the side-by-side comparison of the at least two selected products is displayed on a separate review area on the display of the remote computer from the vertical listing of image data and textual data related to the plurality of products.

38. The system of claim 36, wherein product images in the side-by-side comparison are larger than product images in the vertical listing.

39. The system of claim 30, wherein the textual data includes pricing information.

40. The system of claim 30, wherein the software executable by the processor for receiving at least one user input from the remote computer receives at least two product selections from areas adjacent the displayed image data associated with the at least two selected products from the product data displayed on the display of the remote computer.

41. The system of claim 30, wherein a computer mouse is used by a user to select the at least two products from the product data displayed on the display.

42. The system of claim 30, wherein the vendor's computer and the remote computer communicate via the internet.

43. The system of claim 30, wherein the side-by-side comparison includes a plurality of adjacent review areas, and wherein selected product image data is displayed in the next available review area until all the review areas are filled with product image data, and wherein image data related to the next selected product replaces the product image data in one of the review areas.

44. The system of claim 30, further comprising software executable by the processor for providing a hierarchical menu of product categories from the vendor's computer to the remote computer for display on the display of the remote computer, the hierarchical menu including at least two product categories.

45. The system of claim 44, wherein the hierarchical menu includes first, second, and third level product menus, the second level product menu being displayed in response to a selection of an item in the first level product menu, the third level product menu being displayed in response to a selection of an item from the second level product menu, and wherein the software executable by the processor for providing product data related to a plurality of products from the vendor's computer to the remote computer for display on the display transmits the product data in response to receipt of a user input selecting a category from the third level product menu.

46. The system of claim 30, wherein the image data related to the at least two selected products for side-by-side comparison are positioned on the display of the remote computer in a horizontal row and the textual data related to the selected products is positioned below the respective product image data.

47. The system of claim 30, further comprising software executable by the processor for providing a list of vendors from the vendor's computer to the remote computer, software executable by the processor for receiving a user input from the remote computer selecting at least one vendor, and wherein the software executable by the processor for providing product data related to a plurality of products from the vendor's computer to the remote computer for display on the display provides product data related to a plurality of products available from the selected vendor.

48. The system of claim 30, wherein the software executable by the processor for providing display instructions from the vendor's computer to the remote computer provides a map from the vendor's computer to the remote computer to permit the remote computer to integrate the image data and textual data on the display of the remote computer.

49. The system of claim 30, wherein the vendor's computer is a server.

50. The system of claim 30, wherein the vendor's computer is located at the vendor's place of business.

51. The system of claim 30, further comprising software executable on the processor for providing updated product data associated with the at least two selected products from the memory of the vendor's computer to the remote computer if the product data previously provided to the remote computer is different from the updated product data, the updated product data being associated with the at least two selected products.

52. A method for providing product information related to a plurality of products from a vendor's computer to a remote computer including a display and an input device for review by a user, the method comprising:
storing product data including image data and textual data related to a plurality of products in a memory of the vendor's computer;
storing data related to a plurality of product categories in the memory of the vendor's computer;
providing data related to a plurality of product categories from the vendor's computer to the remote computer for display on the display of the remote computer as selection inputs for the plurality of product categories;
receiving a user input selecting a selection input for a product category from the plurality of product categories displayed on the display of the remote computer;
providing product data for a plurality of products related to the selected product category from the memory of the vendor's computer to the remote computer for display on the display of the remote computer in a product listing including image and textual data related to the plurality of products;
receiving at least one user input from the remote computer selecting at least two products from the product listing displayed on the display of the remote computer for comparison on the display of the remote computer;
providing updated product data associated with the at least two selected products from the memory of the vendor's computer to the remote computer if the product data previously provided to the remote computer is different from the updated product data and
providing display instructions from the vendor's computer to the remote computer, the display instructions providing instructions operative to cause the remote computer to display at least one of the product data and the updated product data received from the vendor's computer as part of a side-by-side comparison wherein an image related to each selected product is displayed along with textual data related to each selected product on the display of the remote computer, the images of the selected products being positioned on the display of the remote computer in a horizontal row and the textual data being displayed below the horizontal row of images to facilitate review and comparison of the selected products by the user.

53. The method of claim 52, wherein the updated product data includes pricing information and the display instructions cause the pricing information to be displayed in the side-by-side comparison.

54. The method of claim 52, further comprising the step of providing a second image from the memory of the vendor's computer to the remote computer, the second image being displayed on the display of the remote computer along with the images of the selected products as part of the side-by-side comparison.

55. The method of claim 54, wherein the images of the selected products overlay the second image.

56. The method of claim 54, wherein the second image is related to a special product promotion.

57. The method of claim 56, wherein the product promotion is related to an event theme.

58. The method of claim 56, wherein the second image is a background image.

59. The method of claim 58, wherein the images of the selected products overlay the background image.

60. The method of claim 54, wherein the display instructions define an exact way how the images related to the selected products, textual data related to the selected products, and the second image are integrated together to provide a visual representation on the display of the remote computer.

61. The method of claim 52, wherein the at least one user input includes a selection of an icon which results in the remote computer displaying the side-by-side comparison on the display of the remote computer.

62. The method of claim 61, wherein the icon is a product icon.

63. The method of claim 52, wherein the data related to the plurality of product categories is provided for display on the display of the remote computer in response to receiving a vendor selection from the remote computer at the vendor's computer, the stored product data related to a plurality of products being product data of products offered for sale by the selected vendor.

64. The method of claim 63, further comprising providing an icon associated with the vendor from the vendor's computer to the remote computer, and the step of receiving a vendor selection from the remote computer comprises receiving a user input selecting the icon.

65. The method of claim 52, wherein the images related to the at least two selected products in the updated product data are different from the images in the product data related to the plurality of products.

66. The method of claim 52, wherein the images of the selected products are positioned on the display of the remote computer in a plurality of horizontal rows and the textual data related to each selected product is displayed below each product image.

* * * * *

UNITED STATES PATENT AND TRADEMARK OFFICE
CERTIFICATE OF CORRECTION

| | | |
|---|---|---|
| PATENT NO. | : 7,908,173 B1 | Page 1 of 1 |
| APPLICATION NO. | : 11/226832 | |
| DATED | : March 15, 2011 | |
| INVENTOR(S) | : Charles E. Hill | |

It is certified that error appears in the above-identified patent and that said Letters Patent is hereby corrected as shown below:

In claim 52, at column 16, line 46, please add a --;-- after the word "data."

In claim 56, at column 17, line 7, please delete the word "special."

In claim 60, at column 17, line 15, please delete the words "an exact way."

Signed and Sealed this
Thirty-first Day of January, 2012

David J. Kappos
*Director of the United States Patent and Trademark Office*